INVENTORS
Hans Wege +
Erich Gast

United States Patent Office 3,579,351
Patented May 18, 1971

3,579,351
COFFEE POWDER PACKAGE
Hans Wege, Hanau-Hohe Tanne, and Eric Gast, Frankfurt, Germany, assignors to Firm Wilhelm Kuhn, Hanau, Germany
Filed Jan. 17, 1969, Ser. No. 791,980
Claims priority, application Germany, Aug. 5, 1968, K 61,973
Int. Cl. B65d 65/00
U.S. Cl. 99—77.1                1 Claim

ABSTRACT OF THE DISCLOSURE

A filter paper bag has an open top end and is partly filled with coffee powder. A flanged plate is secured to said open top end and laterally outwardly protrudes therefrom and is formed with an aperture which communicates with the interior of said bag. A cover closes the aperture. The filter paper bag is entirely enclosed by an aroma-tight wrapper bag.

---

This invention relates to a package containing a portion of coffee powder.

According to the invention, the coffee powder fills part of a bag which is made of filter paper and secured to a flanged ring. The flanged ring is closed by a cover. To provide a package which can be handled in commerce, the arrangement described thus far is enclosed in an aroma-tight, second bag.

When it is desired to use the package, the second bag is opened; the first bag, which depends from the flanged ring and contains the coffee powder, is removed; the flanged ring is placed on the rim of the coffee pot, the cover is opened and boiling water is poured through the flanged ring onto the coffee powder. Filtered coffee beverage is now flowing into the pot from the filter bag which depends in the pot. The level of the coffee beverage in the pot rises until the filter bag is entirely surrounded on the outside by water or coffee beverage and the coffee powder in the bag has been completely extracted.

Thus, the package according to the invention serves also as a coffee percolator and filter. The flanged ring and the cover, which is suitably a press fit in the flanged ring, consist preferably of plastics material. The package is discarded after use so that there is no need for cleaning work and the like.

The drawing shows partly diagrammatically and partly in section an embodiment of the package according to the invention and the use of the package, and in which.

Figure 1:
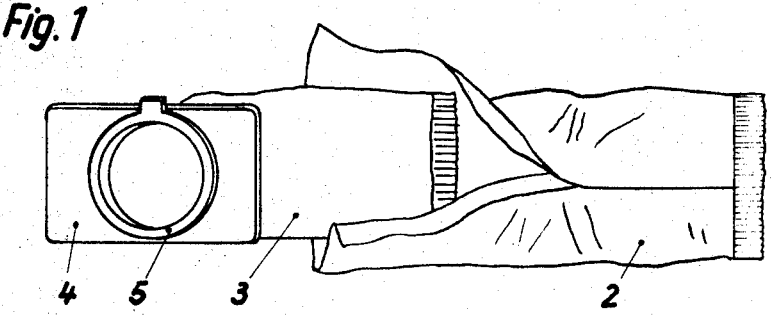
FIG. 1 is a perspective view of the coffee powder package showing the bag and plate being partly separated from the aroma-tight wrapper bag to make it ready for use.
Figure 2:
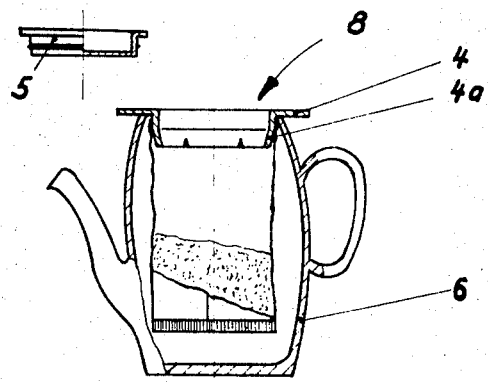
FIG. 2 is a collective fragmentary elevation view of the bag and its supporting plate resting on the upper edge of a coffee pot and with the plastic cover removed from the plate opening to permit liquid to be poured into the bag.
Figure 3:
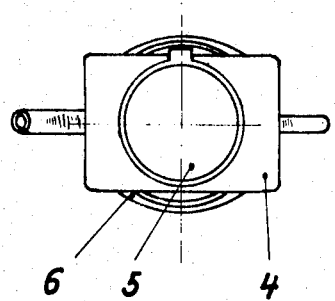
FIG. 3 is a top plan view of the coffee pot and coffee powder package as assembled in FIG. 2.

The bag 3 of filter paper is partly filled with coffee powder. This bag is taken from the aroma-tight wrapper 2 (FIG. 1). The bag of filter paper depends on a stiff plate 4 of plastics material and is heat-sealed to the annular depending flange 4a of said plate. The circular opening 8 of the plate 4 of plastics material is closed by a press-fitted cover 5 (FIG. 3). When the bag 3 has been suspended in the coffee pot 6 and the cover 5 has been removed, boiling water can be poured into the opening 8 (FIG. 2).

What is claimed is:
1. A coffee powder package, comprising an elongated filter paper bag, having an open top end and a closed botom end, said bag being partly filled with powdered coffee, a plastic plate having a depending annular flange and a central opening provided by the flange and extending through the plate, said open top end of the filter bag being secured to and about the depending flange of the plate, said plate opening thereby communicating with the interior of said bag, a cover tightly fitted into the top of the plate opening to enclose the bag, said plate adapted to be supported upon the upper edge of a coffee pot so that the bag containing the coffee may be depended therein while being supported from the plate, and an aroma-tight wrapper bag entirely enclosing said filter paper bag and the plastic supporting plate therefor.

References Cited

UNITED STATES PATENTS 3,446,624   5/1969   Luedtke  ----------- 99—295X

FOREIGN PATENTS 902,986   11/1943   France  ------------- 99—77.1

FRANK W. LUTTER, Primary Examiner
S. H. MARKOWITZ, Assistant Examiner

U.S. Cl. X.R.
99—171, 295